US011844331B2

United States Patent
Qiu

(10) Patent No.: US 11,844,331 B2
(45) Date of Patent: Dec. 19, 2023

(54) PET CARING DIAPER HAVING AN EXCREMENT-COLLECTION FUNCTION

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 773 days.

(21) Appl. No.: 16/969,569

(22) PCT Filed: Jun. 9, 2020

(86) PCT No.: PCT/CN2020/095130
§ 371 (c)(1),
(2) Date: Aug. 13, 2020

(87) PCT Pub. No.: WO2021/203547
PCT Pub. Date: Oct. 14, 2021

(65) Prior Publication Data
US 2022/0039355 A1 Feb. 10, 2022

(30) Foreign Application Priority Data
Apr. 10, 2020 (CN) .......................... 202010277449.8

(51) Int. Cl.
*A01K 23/00* (2006.01)
(52) U.S. Cl.
CPC ................................. *A01K 23/00* (2013.01)

(58) Field of Classification Search
CPC .................................................... A01K 23/00
See application file for complete search history.

(56) References Cited

U.S. PATENT DOCUMENTS 3,656,459 A * 4/1972 Missud ................. A01K 23/00
119/868
4,103,645 A * 8/1978 Tyler ..................... A01K 23/00
119/868

(Continued)

FOREIGN PATENT DOCUMENTS

CN 200953785 Y 10/2007
CN 204994416 U 1/2016

(Continued)

*Primary Examiner* — Dean J Kramer
(74) *Attorney, Agent, or Firm* — Bayramoglu Law Offices LLC

(57) ABSTRACT

A pet caring diaper having an excrement-collection function includes a diaper body and a first collection bag. The diaper body is provided with a first hole, and the first hole is provided with a first connecting member around an outer side of the first hole; the first collection bag is provided with a second connecting member around a mouth of the first collection bag, and sealed at a bottom of the second collection bag; and the second connecting member of the first collection bag matches the first connecting member of the diaper body, and the second connecting member and the first connecting member are connected to each other. The pet caring diaper has advantages of being convenient and sanitary to use, having a low cost, and being comfortable to wear for animals.

4 Claims, 1 Drawing Sheet

(56) References Cited

U.S. PATENT DOCUMENTS

| | | | | |
|---|---|---|---|---|
| 4,269,148 A | * | 5/1981 | Holley-Donawa | A01K 23/00 604/355 |
| 4,353,330 A | * | 10/1982 | Baumgartner | A01K 23/00 119/868 |
| 5,146,874 A | * | 9/1992 | Vidal | A01K 23/00 119/869 |
| 5,937,795 A | * | 8/1999 | Raphael | A01K 23/00 119/869 |
| 6,722,319 B1 | * | 4/2004 | Chiu | A01K 23/00 119/868 |
| 7,861,677 B2 | * | 1/2011 | Habig | A01K 23/00 119/868 |
| 9,028,460 B2 | * | 5/2015 | Medeiros | A61F 5/451 604/347 |
| 9,113,613 B2 | * | 8/2015 | Dixon | A01K 23/00 |

FOREIGN PATENT DOCUMENTS

| | | | | |
|---|---|---|---|---|
| CN | 109549783 A | | 4/2019 | |
| GB | 2169185 A | * | 7/1986 | A01K 23/00 |
| JP | 2005333954 A | | 12/2005 | |

\* cited by examiner

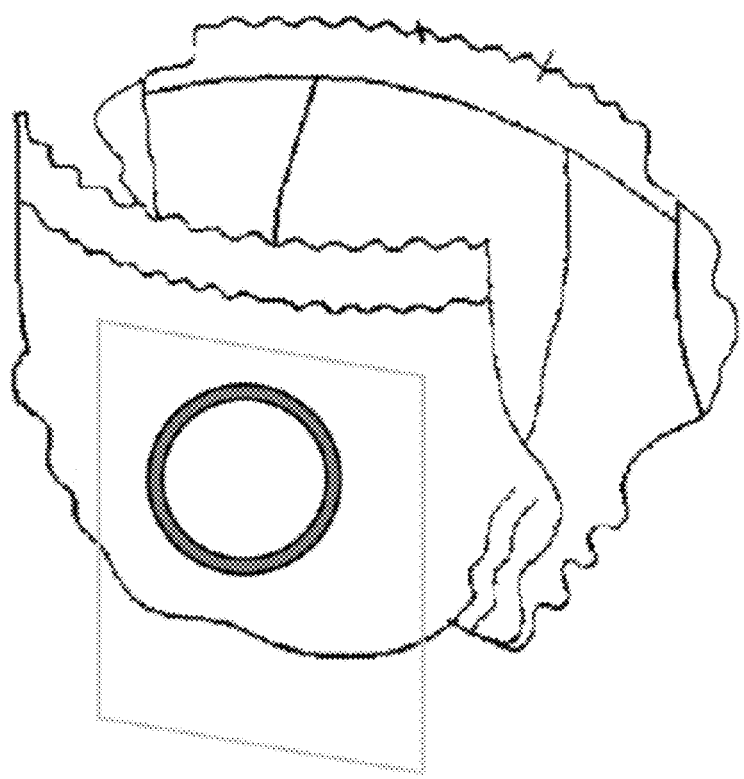

PET CARING DIAPER HAVING AN EXCREMENT-COLLECTION FUNCTION

CROSS REFERENCE TO THE RELATED APPLICATIONS

This application is the national stage entry of International Application No. PCT/CN2020/095130, filed on Jun. 9, 2020, which is based upon and claims priority to Chinese Patent Application No. 202010277449.8, filed on Apr. 10, 2020, the entire contents of which are incorporated herein by reference.

TECHNICAL FIELD

The present invention relates to the field of pet supply technologies, and specifically to a pet caring diaper.

BACKGROUND

In recent years, more and more people start to keep pets, such as cats and dogs. When a pet is kept at home and does not form a good excretion habit, there are problems of pets excreting on the room wall, furniture, etc., which may contaminate the room; when taking the pet out for a walk to excrete, in order to avoid environmental pollution by excrement, the owner needs to pick it up or clean it up afterwards, but even after cleaning, there is still some liquid contaminating the ground, thereby causing ground pollution; and when the pet is sick, there may also be a problem of uncontrolled excretion. Therefore, a pet caring diaper is launched on the market.

For example, CN204994416 discloses a pet caring diaper, which is characterized in that it includes an absorbent body and a main body part with a structure of at least two layers for clamping and holding the absorbent body; the main body part is provided with a hole at the hip position for penetrating the pet's tail when the diaper is worn for the pet, and a three-dimensional water-repellent non-woven fabric area is arranged on both sides of the short edge of the approximate rectangle on the main body part.

This pet caring diaper is designed to wrap the pet's excretion part, such that the feces excreted by the pet will be left in the pet caring diaper, thus being easy to adhere to the pet body during activities of the pet. After excretion, the pet caring diaper has to be replaced as a whole, and the pet body must be cleaned, which is quite inconvenient.

Secondly, although this pet caring diaper is designed with a hole for penetrating the pet's tail, because the hole is arranged at a fixed position and cannot be adjusted according to the actual body condition of the pet, there may be a situation that the position of the pet's tail is too high or too low to correspond to the position of the hole, or that the pet's tail is too thick to penetrate the aperture and the aperture cannot be changed according to the size of the pet.

Moreover, frequent replacement of diapers will not only cause a waste of resources, but also lead to environmental pollution.

SUMMARY

In order to solve the above problems, the present invention provides the following solution:

a pet caring diaper having an excrement-collection function is provided, which comprises: a diaper body and a first collection bag; the diaper body is provided with a first hole used for accommodating a defecation organ of the pet, and the first hole is provided with a first connecting member around its outer side; the first collection bag used for collecting feces excrement of the pet is provided with a second connecting member around the outer side of its mouth, and is sealed at its bottom; and the second connecting member of the first collection bag matches the first connecting member of the diaper body, and they are directly connected to each other.

In one embodiment, the diaper body is provided with a second hole and comprises a second collection bag. The second hole is used for accommodating the pet's excretory organ of urine, and is provided with a third connecting member around its outer side. The second collection bag is used for collecting urine excrement of the pet, and it is provided with a fourth connecting member around the outer side of its mouth, and is sealed at its bottom. The setting of the present invention is conducive to nursing on pets when they are sick and unable to control their feces and urine.

In one embodiment, the fourth connecting member of the second collection bag matches the third connecting member of the diaper body, and they are directly connected to each other.

In one embodiment, the second collection bag is indirectly connected to the second hole through a catheter.

In one embodiment, a nonabsorbent material is provided around the inner side of the first or second hole contacting the pet, for preventing adhesion of excrement.

In one embodiment, the first or second collection bag is a stacked structure, successively comprising from outside in: a waterproof layer, an antibacterial isolation layer, and a water absorbing layer. The waterproof layer is used for preventing leakage of liquid in the excrement from the collection bag, the water absorbing layer is used for absorbing liquid in the excrement to lower the probability of leakage, and the antibacterial isolation layer is used for inhibiting bacteria in the excrement to reduce the probability of secondary pollution.

In one embodiment, the first or second collection bag is further provided with a fitting ring around its mouth, the fitting ring is a flexible material which is deformable according to a pet contact part, for fitting the mouth of the collection bag with the pet contact part, and the inner periphery of the fitting ring is connected to the outer periphery of the second connecting member.

In one embodiment, the first or second collection bag is further provided with a binding-off member at its mouth, for binding off the mouth of the collection bag before the collection bag or diaper is removed after excretion of the pet is completed. In one embodiment, the binding-off member is a pull rope. In one embodiment, the binding-off member is a clip.

In one embodiment, the connection between the first or second collection bag and the first hole or second hole of the diaper body is a detachable connection, which is sufficient for enabling the collection bag to be firmly connected to the diaper body without being detached in the absence of external forces. In one embodiment, the first, second, third or fourth connecting member is an adhesive, a snap ring or a Velcro.

In one embodiment, the diaper body is reusable. After being detached, the used collection bag can be replaced with a new unused collection bag, thereby saving resources and reducing environmental pollution caused by diapers.

In one embodiment, the connection between the first or second collection bag and the first or second hole of the diaper body is a sealed fixed connection.

In one embodiment, the pet caring diaper further comprises an independent opener, for opening a third hole at a position on the diaper body corresponding to the pet's tail, to penetrate the pet's tail out of the diaper body.

In one embodiment, the pet caring diaper further comprises an orifice snap ring, for fixing the shape of the third hole after the third hole is opened, thereby facilitating the penetration of the pet's tail and achieving more comfortable wearing.

By solving the above problem, the present invention has the following advantages:

1. The pet caring diaper of the present invention collects the excrement of the pet separately in the collection bag, such that the excrement will not adhere to the pet body during activities of the pet. It has the advantages of being convenient and sanitary to use. Moreover, by means of material and process control, the cost of the excrement collection bag can be controlled to merely increase by 2%-3%.

2. The pet caring diaper of the present invention adopts a detachable design between the diaper and the collection bag, which enables the diaper body to be reusable, thus saving resources and reducing environmental pollution caused by diapers.

3. The collection bag of the pet caring diaper of the present invention is provided with a fitting ring, such that the mouth of the collection bag is deformable according to the pet contact part, to closely fit the mouth of the collection bag with the pet contact part, thereby preventing the excrement from contaminating the diaper body.

4. The multi-layer design adopted by the collection bag of the pet caring diaper of the present invention can effectively prevent leakage of liquid in the excrement from the collection bag, thereby lowering the probability of liquid leakage, and effectively inhibiting bacteria in the excrement to reduce the probability of secondary pollution.

5. The binding-off member arranged on the collection bag of the pet caring diaper in the present invention can effectively prevent inverted leakage of excrement. It is convenient to collect the excrement of the pet into the collection bag, thus being sanitary and being able to reduce environmental pollution.

6. The opener and/or orifice snap ring provided by the pet caring diaper of the present invention can open a hole according to the actual body shape of the pet. The fur of the pet's tail is fluffy and soft, which is an important organ for emotional expression. The present invention is conducive to the comfort of pet wearing, and to the expression of emotion through the tail. At the same time, the complexity of the design in the production and design process of the manufacturer is reduced, and the waste of resources caused by improper holes can also be avoided.

BRIEF DESCRIPTION OF THE DRAWINGS

FIGURE is a schematic diagram of inside appearance according to an embodiment of the present invention.

DETAILED DESCRIPTION OF THE EMBODIMENTS

In order to make the abovementioned objectives, effects, and features of the present invention be understood more specifically, further illustration on the specific embodiments will be given below with reference to the accompanying drawings.

Embodiment 1

As shown in the FIGURE, the pet caring diaper having an excrement-collection function provided by the present invention includes: a diaper body and a first collection bag. The diaper body is provided with a first hole, and the first hole is located at a position corresponding to the defecation organ of the pet. A first fastening tape is arranged around the outer side of the first hole. The first collection bag is provided with a second fastening tape around its mouth, and is sealed at its bottom. The second fastening tape of the first collection bag matches the first fastening tape of the diaper body.

The fastening tape may also be a magic clasp or so.

A nonabsorbent material is provided around the inner side of the first hole contacting the pet.

The diaper body includes: a permeable layer, an acquisition distribution layer, a water absorbing layer and a water proof layer, which are sequentially stacked from top to bottom; the edge of the waterproof layer is folded upward to wrap the upper edge of the permeable layer, thereby preventing side leakage.

Both ends of the diaper body are provided with an adhesive layer, and the diaper body is arranged at the front and rear sides of a pet use part respectively through the adhesive layer.

The first collection bag is a stacked structure, successively including from outside in: a waterproof layer, an antibacterial isolation layer, and a water absorbing layer. The waterproof layer is a non-woven fabric waterproof layer used for preventing leakage of liquid in the excrement from the collection bag, the water absorbing layer is used for absorbing liquid in the excrement to lower the probability of leakage, and the antibacterial isolation layer is used for inhibiting bacteria in the excrement to reduce the probability of secondary pollution.

The mouth diameter of the first collection bag is less than or equal to the bottom diameter thereof. The first collection bag is further provided with a fitting ring around its mouth. The fitting ring is flexible material, which is deformable according to the pet contact part, to fit the mouth of the collection bag with the pet contact part. The inner periphery of the fitting ring is connected to the outer periphery of the second fastening tape at the mouth of the first collection bag.

The first collection bag is further provided with a pull rope at its mouth, for binding off the mouth of the collection bag before the collection bag or diaper is removed after excretion of the pet is completed, thereby preventing inverted leakage of excrement.

The connection between the second fastening tape of the first collection bag and the first fastening tape of the first hole of the diaper body is a detachable connection. After repeated experiment, the connection is sufficient for enabling the collection bag to be firmly connected to the diaper body without being detached in the absence of external forces, and to be firmly connected to the diaper body after a new first collection bag is replaced.

The pet caring diaper further includes an independent opener, for opening a third hole at a position on the diaper body corresponding to the pet's tail to penetrate the pet's tail out of the diaper body.

The pet caring diaper further includes an independent orifice snap ring, for fixing the shape of the third hole after the third hole is opened, thereby facilitating the penetration of the pet's tail and achieving more comfortable wearing.

Embodiment 2

The pet caring diaper having an excrement-collection function provided by the present invention includes: a diaper body and a first collection bag. Both ends of the diaper body 1 are provided with an adhesive layer, and when being worn, the diaper body is arranged at the front and rear sides of a pet use part respectively through the adhesive layer.

A first hole is provided on the rear side of the diaper body, and is located at a position corresponding to the defecation organ of the pet. A first snap ring is arranged around the outer side of the first hole. The first collection bag is provided with a second snap ring around its mouth, and is sealed at its bottom. The second snap ring of the first collection bag matches the first snap ring of the diaper body.

The diaper body is further provided with a second hole and a second collection bag. The second hole is located at a position corresponding to the urination organ of the pet, and is provided with a third snap ring around its outer side; the second collection bag is provided with a fourth snap ring around the outer side of its mouth, and is sealed at its bottom; the fourth snap ring of the second collection bag matches the third snap ring of the diaper body, and they are connected to each other.

The diaper body includes: a permeable layer, an acquisition distribution layer, a water absorbing layer and a water proof layer, which are sequentially stacked from top to bottom; the edge of the waterproof layer is folded upward to wrap the upper edge of the permeable layer, thereby preventing side leakage.

The first collection bag is a stacked structure, successively including from outside in: a waterproof layer, an antibacterial isolation layer, and a water absorbing layer. The waterproof layer is a non-woven fabric waterproof layer used for preventing leakage of liquid in the excrement from the collection bag, the water absorbing layer is used for absorbing liquid in the excrement to lower the probability of leakage, and the antibacterial isolation layer is used for inhibiting bacteria in the excrement to reduce the probability of secondary pollution.

The connection between the first collection bag and the first hole of the diaper body is a detachable connection. After repeated experiment, the connection is sufficient for enabling the collection bag to be firmly connected to the diaper body without being detached in the absence of external forces, and to be firmly connected to the diaper body after a new first collection bag is replaced.

The second collection bag is a stacked structure, successively including from outside in: a waterproof layer, an antibacterial isolation layer, and a water absorbing layer. The waterproof layer is a non-woven fabric waterproof layer used for preventing leakage of liquid in the excrement from the collection bag, the water absorbing layer is absorbent cotton used for solidifying the excrement to prevent leakage, and the antibacterial isolation layer is used for inhibiting bacteria in the excrement to reduce the probability of secondary pollution.

The second collection bag is indirectly connected to the second hole through a catheter. The catheter is provided with a spherical container at its upper end, and a pipe at its lower end, for connecting to the second hole. The mouth of the second collection bag is connected to the pipe at the lower end of the catheter through a snap ring.

The first or second collection bag is further provided with a pull rope at its mouth, for binding off the mouth of the collection bag before the collection bag or diaper is removed after excretion of the pet is completed, thereby preventing inverted leakage of excrement.

The pet caring diaper further includes an independent opener, for opening a third hole at a position on the diaper body corresponding to the pet's tail to penetrate the pet's tail out of the diaper body.

The pet caring diaper further includes an independent orifice snap ring, for fixing the shape of the third hole after the third hole is opened, thereby facilitating the penetration of the pet's tail and achieving more comfortable wearing.

Embodiment 3

The present invention includes a diaper body and a first collection bag. Both ends of the diaper body are provided with an adhesive layer, and when being worn, the diaper body is arranged at the front and rear sides of a pet use part respectively through the adhesive layer. A first hole is provided on the rear side of the diaper body, and is located at a position corresponding to the defecation organ of the pet. The first collection bag is hermetically fixed on the outer side of the first hole. A nonabsorbent material is provided around the inner side of the first hole contacting the pet.

The diaper body 1 includes: a permeable layer, an acquisition distribution layer, a water absorbing layer and a water proof layer, which are stacked from top to bottom; the edge of the waterproof layer is folded upward to wrap the upper edge of the permeable layer, thereby preventing side leakage.

Both ends of the diaper body are provided with an adhesive layer, and the diaper body is arranged at the front and rear sides of the pet use part respectively through the adhesive layer.

The first collection bag is a stacked structure, successively including from outside in: a waterproof layer, an antibacterial isolation layer, and a water absorbing layer. The waterproof layer is a non-woven fabric waterproof layer used for preventing leakage of liquid in the excrement from the collection bag, the water absorbing layer is used for absorbing liquid in the excrement to lower the probability of leakage, and the antibacterial isolation layer is used for inhibiting bacteria in the excrement to reduce the probability of secondary pollution.

The mouth diameter of the first collection bag is less than or equal to the bottom diameter thereof. The first collection bag is further provided with a fitting ring around its mouth. The fitting ring is flexible material, which is deformable according to the pet contact part, to fit the mouth of the collection bag with the pet contact part. The inner periphery of the fitting ring is connected to the outer periphery of the second fastening tape at the mouth of the first collection bag.

The first collection bag is further provided with a pull rope at its mouth, for binding off the mouth of the collection bag before the collection bag or diaper is removed after excretion of the pet is completed, thereby preventing inverted leakage of excrement.

The pet caring diaper further includes an independent opener, for opening a third hole at a position on the diaper body corresponding to the pet's tail to penetrate the pet's tail out of the diaper body.

The pet caring diaper further includes an independent orifice snap ring, for fixing the shape of the third hole after the third hole is opened, thereby facilitating the penetration of the pet's tail and achieving more comfortable wearing.

Although the content of the present invention has been disclosed in detail through the above preferred embodiments, it shall be realized that the above description should not be intended to limit the present invention. After persons skilled in the art read the above content, various modifications and replacements made to the present invention will be obvious. Therefore, the protection scope of the present invention should be defined by the attached claims.

What is claimed is:

1. A pet caring diaper having an excrement-collection function, comprising a diaper body and a first collection bag, wherein the diaper body is provided with a first hole, and the first hole is provided with a first connecting member around an outer side of the first hole; the first collection bag is provided with a second connecting member around a mouth of the first collection bag, and the first collection bag is sealed at a bottom of the first collection bag; the second connecting member of the first collection bag matches the first connecting member of the diaper body, and the second connecting member and the first connecting member are connected to each other; and the first collection bag is a stacked structure, successively comprising from outside to inside: a waterproof layer, an antibacterial isolation layer, and a water absorbing layer.

2. The pet caring diaper according to claim 1, wherein a nonabsorbent material is provided around an inner side of the first hole, and the first hole contacts a pet.

3. The pet caring diaper according to claim 1, wherein the first collection bag is further provided with a fitting ring around the mouth of the first collection bag, the fitting ring is a flexible material, wherein the fitting ring is deformable according to a pet contact part, for fitting the mouth of the first collection bag with the pet contact part, and an inner periphery of the fitting ring is connected to an outer periphery of the second connecting member.

4. The pet caring diaper according to claim 1, wherein a connection between the first collection bag and the first hole of the diaper body is a detachable connection.

* * * * *